United States Patent
Oh et al.

(10) Patent No.: US 9,317,295 B2
(45) Date of Patent: Apr. 19, 2016

(54) ASYNCHRONOUS PIPELINE SYSTEM, STAGE, AND DATA TRANSFER MECHANISM

(75) Inventors: Myeong Hoon Oh, Daejeon (KR); Young Woo Kim, Daejeon (KR); Sung Nam Kim, Daejeon (KR); Seong Woon Kim, Gyeryong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 751 days.

(21) Appl. No.: 13/278,385

(22) Filed: Oct. 21, 2011

(65) Prior Publication Data

US 2012/0102300 A1  Apr. 26, 2012

(30) Foreign Application Priority Data

Oct. 22, 2010  (KR) .................. 10-2010-0103472

(51) Int. Cl.
G06F 9/38 (2006.01)

(52) U.S. Cl.
CPC ............ *G06F 9/3871* (2013.01); *G06F 9/3869* (2013.01)

(58) Field of Classification Search
CPC .......... G06F 9/4436; G06F 2207/3864; G06F 2207/3888; G06F 17/5059; G06F 9/3871; G06F 9/3869
USPC ........................................................ 712/201
See application file for complete search history.

(56) References Cited

U.S. PATENT DOCUMENTS

| | | | | |
|---|---|---|---|---|
| 6,038,656 | A * | 3/2000 | Martin et al. ................ | 712/211 |
| 6,211,704 | B1 * | 4/2001 | Kong ............................ | 326/121 |
| 6,381,692 | B1 * | 4/2002 | Martin et al. ................ | 712/244 |
| 6,502,180 | B1 * | 12/2002 | Martin et al. .................. | 712/25 |
| 6,658,550 | B2 * | 12/2003 | Martin et al. .................. | 712/23 |
| 6,925,549 | B2 * | 8/2005 | Cook et al. ..................... | 712/25 |
| 7,157,934 | B2 * | 1/2007 | Teifel et al. .................... | 326/38 |
| 8,495,543 | B2 * | 7/2013 | Dimou et al. ................. | 716/114 |
| 2003/0140214 | A1 * | 7/2003 | Martin et al. ................... | 712/25 |
| 2005/0097306 | A1 * | 5/2005 | Gajski .......................... | 712/245 |

FOREIGN PATENT DOCUMENTS

| | | |
|---|---|---|
| KR | 2003-0051779 | 6/2003 |
| KR | 2003-0056012 | 7/2003 |
| KR | 10-0861073 | 9/2008 |
| KR | 10-0874498 | 12/2008 |
| WO | 02/37787 A1 | 5/2002 |
| WO | WO 2009155370 A1 * | 12/2009 ........... H03K 19/096 |

\* cited by examiner

*Primary Examiner* — Benjamin Geib

(74) *Attorney, Agent, or Firm* — Nelson Mullins Riley & Scarborough LLP; Anthony A. Laurentano; Michael Malone

(57) ABSTRACT

Disclosed are an asynchronous pipeline system, a stage, and a data transfer mechanism. The asynchronous pipeline system having a plurality of stages based on a 4-phase protocol, includes: a first stage among the plurality of stages; and a second stage among the plurality of stages connected next to the first stage, wherein the first stage transmits and the second receives bundled data and control data through an always bundled data channel and on-demand data through an on-demand data channel according to need of the second stage.

4 Claims, 7 Drawing Sheets

ASYNCHRONOUS PIPELINE SYSTEM, STAGE, AND DATA TRANSFER MECHANISM

CROSS-REFERENCE TO RELATED APPLICATIONS

This application claims priority under 35 U.S.C. §119 to Korean Patent Application No. 10-2010-0103472, filed on Oct. 22, 2010, in the Korean Intellectual Property Office, the disclosure of which is incorporated herein by reference in its entirety.

TECHNICAL FIELD

The present invention relates to an asynchronous pipeline, and more particularly, to an asynchronous pipe line system, a stage, and a data transfer mechanism that can reduce power consumption for data transfer.

BACKGROUND

In general, a system using a processor is divided into a synchronous type and an asynchronous type. The synchronous type drives an entire system with a global clock and the asynchronous type drives a required module only to operate the data.

In particular, since the asynchronous type does not use the global clock, the asynchronous type is regarded as a good alternative capable of solving problems of the synchronous type, such as skew of the global clock, jitter, power consumption of a clock tree, or timing closure, and the like.

Since a pipeline structure is generally in a processor structure an asynchronous type processor with the pipeline structure has been developed in recent years.

As one example of the related art, an asynchronous pipeline which controls the data flow of one stage was disclosed in U.S. Pat. No. 6,925,549.

Individual stages of the asynchronous pipeline according to the one example are divided into a data path and a control path. A control processor in the control path assigns a tag value (i.e., a control tag) of each stage in advance.

A previous stage transmits a data tag through the control path and data through the data path. At this point, the previous stage compares control tag of the previous stage with the data tag of the previous stage, and performs a transmission process driving a latch of the data path when control tag and the data tag of the previous stage coincide with each other. A current stage completes processing and transmits the control tag of the current stage and processing result data to a next stage. At this point, the current stage compares control tag of the current stage with data tag of the current stage and transfers a hand shake protocol request signal to the next stage when the control tag and the data tag coincide with each other. By the way, when the control tag and the data tag do not coincide with each other, the hand shake protocol request signal is not generated, and as a result, a stall phenomenon in which the control tag and the processing result data are not transferred to the next stage occurs. One example of the related art could perform a reoperation sensing the stall situation.

However, in the asynchronous pipeline according to one example, since the number of interfaces of all stages is the same and a command used only at the current stage should be continuously transmitted to subsequent stages by hardware, unnecessary power consumption was generated.

As another example of the related art, a parallel processing processor structure adopting an adaptive pipeline is disclosed in Korea Patent Registration No. 10-0861073.

In the asynchronous pipeline according to another example, the position of a stage of the pipeline is adaptively changed according to a command which is being executed and the type of data transferred between stages may be changed by variation of the number of individual stages or the execution command. Further, the data path of the entire system is divided according to the type of the command to process different commands in parallel without increasing hardware.

However, even in the asynchronous pipeline according to another example, the problem related to the power consumption is not largely improved by a variable stage since the command required only at the previous stage should be transmitted to subsequent stages in order to prevent stall.

SUMMARY

An exemplary embodiment of the present invention provides an asynchronous pipeline system having a plurality of stages based on a 4-phase protocol, includes: a first stage among the plurality of stages; and a second stage among the plurality of stages connected next to the first stage, wherein the first stage transmits and the second receives bundled data and control data through an always bundled data channel and on-demand data through an on-demand data channel according to need of the second stage.

Another exemplary embodiment of the present invention provides a stage of an asynchronous pipeline system includes: an always input block which is a path receiving bundled data and control data from a previous stage; a plurality of on-demand input blocks which are paths receiving at least one of a plurality of on-demand data from the previous stage; a control block enabling the always input block when a hand shake protocol request signal is transferred from the previous stage; and a stage logic verifies the on-demand data to be used at a current stage receiving the control data through the enabled always input block and receives the verified on-demand data from at least one of the plurality of on-demand input blocks according to the control of the control block reporting the verified on-demand data to the control block.

Yet another exemplary embodiment of the present invention provides a data transfer mechanism for transmitting data of an asynchronous pipeline system includes: enabling an always bundled data channel when a hand shake protocol request signal is transferred from a previous stage; receiving bundled data and control data from the previous stage through the always bundled data channel; verifying data of a current stage in the bundled data from the control data and performing calculation using the data of the current stage; verifying on-demand data required at the current stage from the control data; selectively activating an input channel of the required on-demand data in an on-demand data channel; and receiving the on-demand data through the activated input channel and performing calculation of the on-demand data.

Other features and aspects will be apparent from the following detailed description, the drawings, and the claims.

DETAILED DESCRIPTION OF EMBODIMENTS

Figure 1:
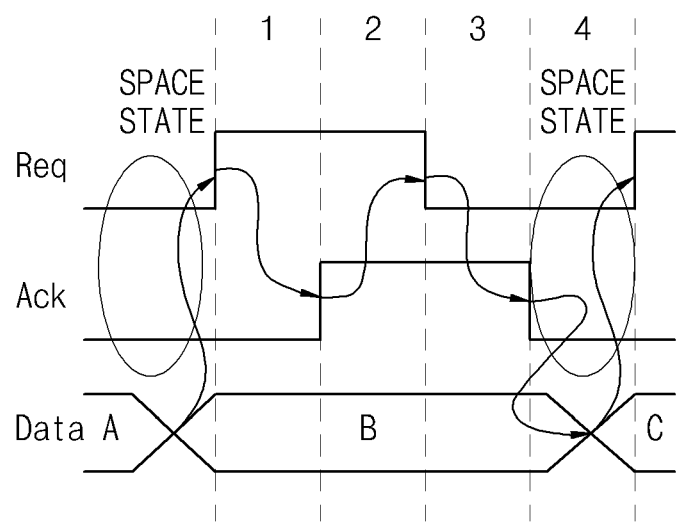
FIG. 1 is a timing diagram of a 4-phase bundled data protocol control signal.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, referring to FIGS. 1 to 4, a 4-phase bundled data protocol, an asynchronous pipeline structure, and an interface of each stage in which the present invention is based on will be described.

FIG. 1 is a timing diagram of a 4-phase bundled data protocol control signal in the related art.

As shown in FIG. 1, each stage of an asynchronous system in the related art using the 4-phase bundled data protocol requires 4-phase state transition by four subsequent events such as hand shake protocol request (Req) signal rising 1, hand shake protocol acknowledge (Ack) signal rising 2, Req signal falling 3, and Ack signal falling 4, in order to transmit a data symbol 'B'.

In each stage, when the 4-phase state transition is completed, both Req signal and Ack signal are maintained to '0', that is, a space state, prior to transmitting a data symbol 'C', to discriminate the data symbols 'B' and 'C' at the next stage.

Herein, a timing when a receiver stage senses and stores effective data A, B, and C by the Req signal and a timing when a transfer stage prepares for the next data by a Ack signal may be changed depending on a use environment of the asynchronous system or a designer's intention.

In the asynchronous system using the 4-phase bundled data protocol, since it is assumed that transmitted data is already stable at a rising timing of the Req signal, it is necessary to take notice of the assumption in implementing the asynchronous system. On the other hand, a specialized cell library is not required and the asynchronous system can be connected directly to a latch of a standard cell or a clock port of a flip-flop due to the assumption, it may be easy to implement the asynchronous system.

Figure 2:
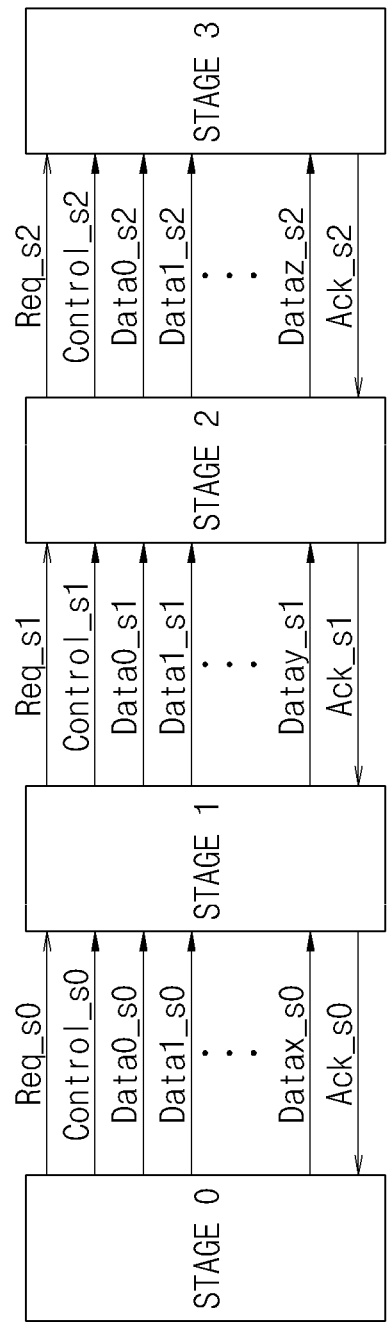
FIG. 2 is a configuration diagram showing a structure of an asynchronous pipeline using a 4-phase bundled data protocol.

Hereinafter, FIG. 2 is a configuration diagram showing a structure of an asynchronous pipeline in the related art using a 4-phase bundled data protocol. In FIG. 2, a case in which x+1 bundled data exist between stage 0 and stage 1, y+1 bundled data exist between stage 1 and stage 2, and z+1 bundled data exist between stage 2 and stage 3 is shown as an example.

As shown in FIG. 2, the individual stages transmit control data Control_s0, Control_s1, and Control_s2 controlling a function of each stage and input data Data0_$s0$ to Dataz_s2 used in calculation to the next stages. In this case, the individual stages accompany pairs (Req_s0, Ack_s0), (Req_s1, Ack_s10), and (Req_s2, Ack_s2) of the Req/Ack signals depending on the hand shake protocol. Herein, since input data are transmitted just like a bundle unit together with a pair of Req/Ack signals, the input data are called bundled data.

Figure 3:
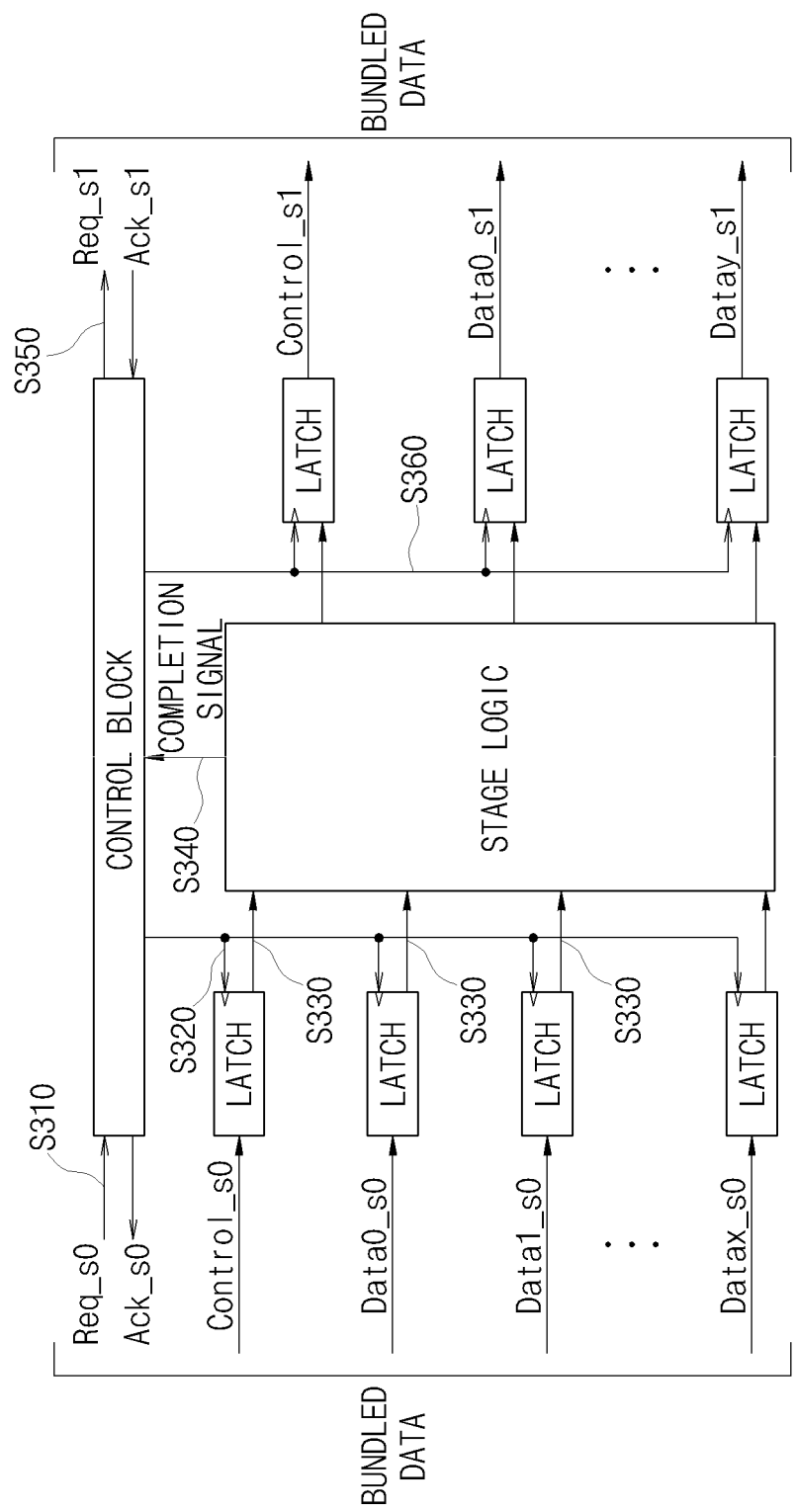
FIG. 3 is a diagram showing a structure of each stage of an asynchronous pipeline.
Figure 4:
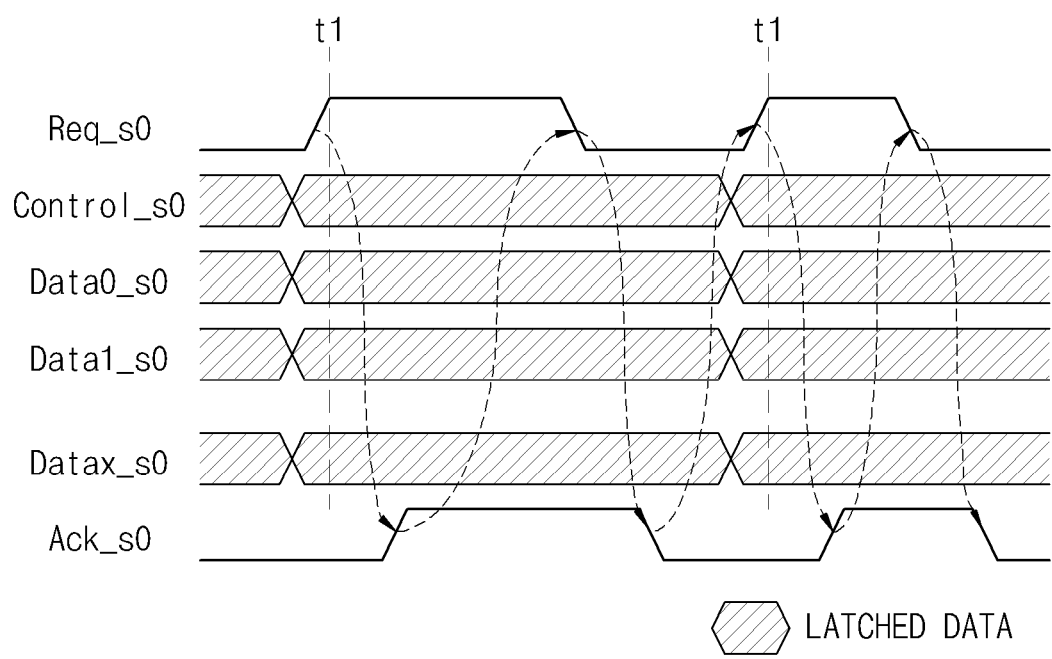
FIG. 4 is a timing diagram of a signal transmitted and received between stage 0 and stage 1 of FIG. 3.

Hereinafter, FIG. 3 is a diagram showing a structure of each stage of the asynchronous pipeline in the related art and FIG. 4 is a timing diagram of a signal transmitted and received between stage 0 and stage 1 of FIG. 3.

As shown in FIG. 3, the individual stages include a logic block performing a unique function of each stage, a latch (alternatively, a flip-flop) storing input/output data, and a control block enabling an input latch.

An operational sequence will be described below. When the control block recognizes the rising of the Req signal (S310), the control block activates a latch enable signal (S320).

Therefore, the control data and the bundled data are inputted into a stage logic (S330) and the stage logic selects data required at the current stage from the bundled data decoding the control data, performs calculation corresponding thereto and thereafter, and outputs a completion signal indicating calculation termination (S340).

The control block generates Req/Ack signals Req_s1 and Ack_s1 to be transferred stages 2 (S350) and activates an enable signal for outputting data generated by a calculation result (S360). In this case, the stage logic outputs all result data of the current stage and an encoding result of control data Control_S1 to be used at the next stage even though the data are not the data required at the next stage.

As shown in FIG. 4, since all data Data0_$s0$ to Datax_s0 transferred from stage 0 to stage 1 is bundled, both the control signal and x+1 data are latched according to the Req signal Req_s0 and the Ack signal Ack_s0. Herein, a latch timing is a timing t1 when the Req signal rises and thereafter, the Req signal and the Ack signal are subjected to 4-phase state transition. In this case, as described above, it is assumed that all the input data Data0_$s0$ to Datax_s0 are stable before the Req signal Req_s0 rises.

As described above, in the asynchronous pipeline system in the related art, the individual stages transmitted all data inputted into the next stages. In most cases, since the number of input data required at each stage varies depending on the command, all the input data need not to be latched to the next stage. Since the asynchronous pipeline in the related art collectively latches all data, the asynchronous pipeline in the related art is very inefficient in terms of power consumption. Due to the inefficiency, as the number of individual data increases, more power consumption is wasted.

Figure 5:
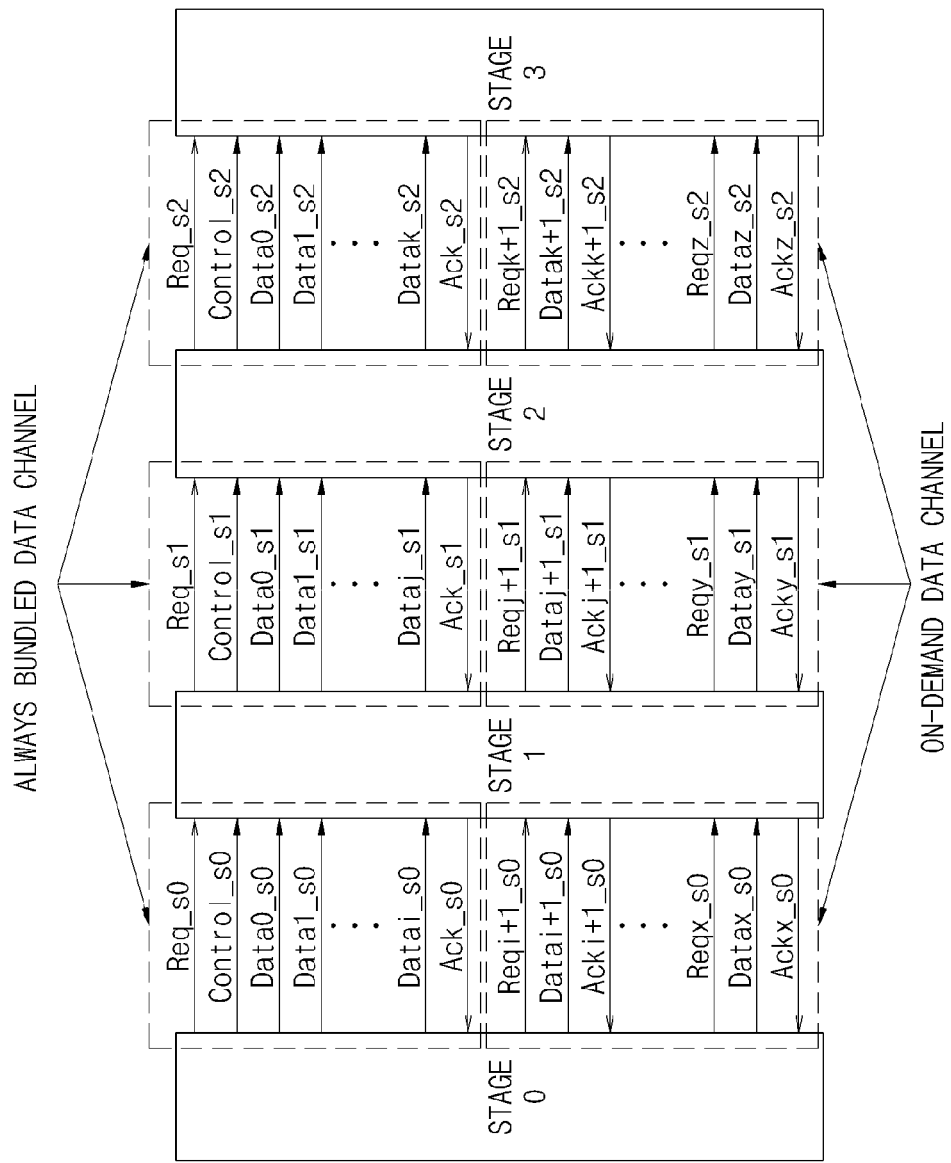
FIG. 5 is a block diagram of an asynchronous pipeline system according to an exemplary embodiment of the present invention.
Figure 6:
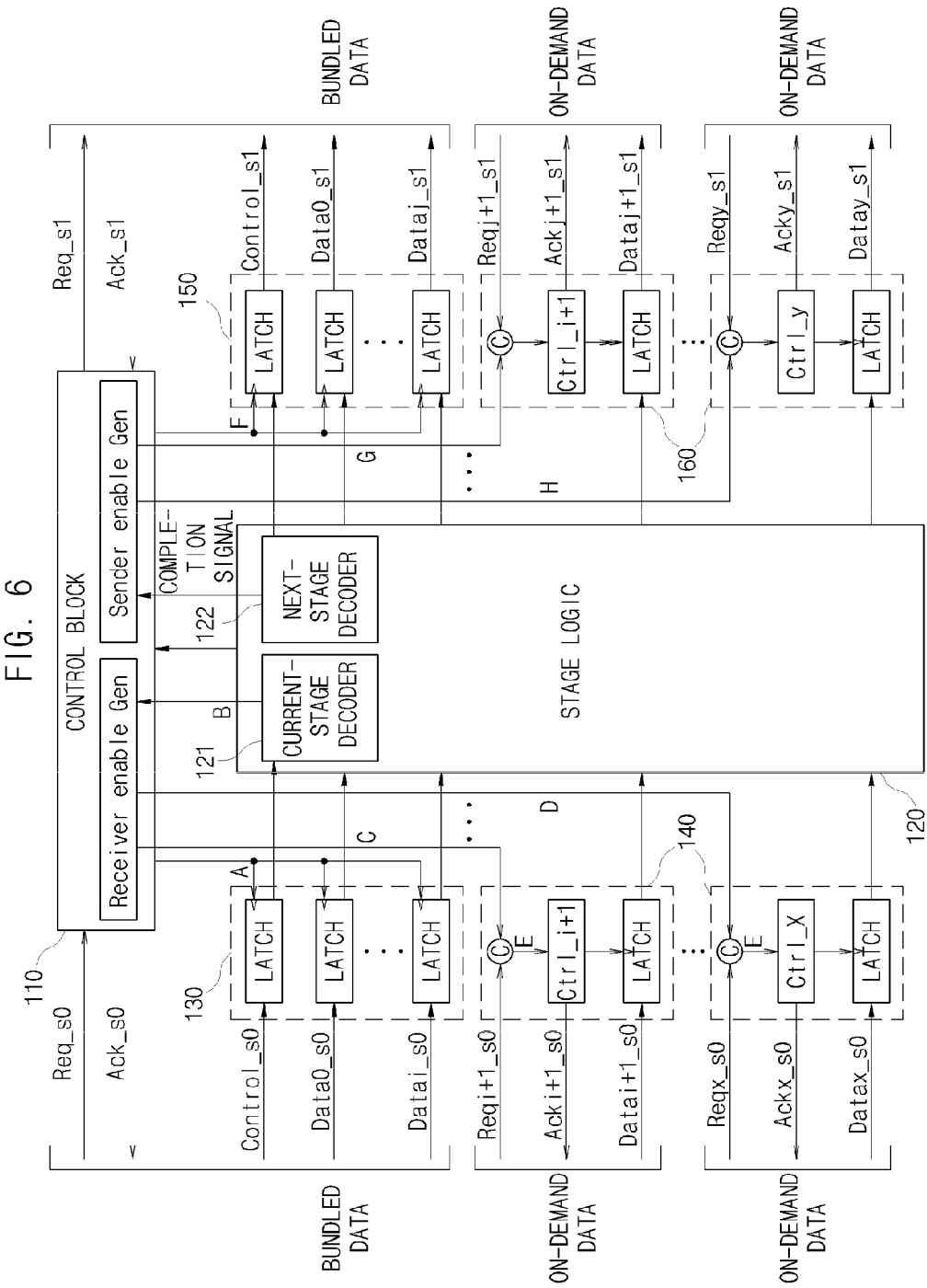
FIG. 6 is a diagram specifically showing each stage of FIG. 5.

Hereinafter, an exemplary embodiment of the present invention will be described in detail with reference to the accompanying drawings. FIG. 5 is a block diagram of an asynchronous pipeline system according to an exemplary embodiment of the present invention and FIG. 6 is a diagram specifically showing each stage of FIG. 5. In this case, according to a design, the number of bundled data of individual stages and the number of on-demand data may be different from each other.

As shown in FIG. 5, the individual stages of the asynchronous pipeline system according to the exemplary embodiment of the present invention includes an always bundled data channel for transmitting the bundled data and an on-demand bundled data channel for transmitting the on-demand data.

Hereinafter, an interface between stage 0 and stage 1 will be described as an example.

Stage 0 transmits i+1 bundled data always and x−i on-demand data according to needs of stage 1, dividing x+1 data transmitted in bundle in the related art.

Stage 0 transmits and receives control data Control_s0, i+1 bundled data Data0_s0 to Datai_s0, and Req/Ack signals Req_s0 and Ack_s0 through the always bundled data channel. Herein, the bundled data Data0_s0 to Datai_s0 are transmitted to stage 1 by the Req/Ack signals Req_s0 and Ack_s0 every cycle.

Stage 0 transmits and receives i+1-th to x-th on-demand data DataDi+1_s0 to DataDx_s0 and i+1-th to x-th Req/Ack signals ReqDi+1_s0 to ReqDx_s0 and AckDi+1_s0 to AckDx_s0 through the on-demand data channel. The i+1-th to x-th on-demand data DataDi+1_s0 to DataDx_s0 are transferred to stage 1 when the i+1-th to x-th Req/Ack signals ReqDi+1_s0 to ReqDx_s0 and AckDi+1_s0 to AckDx_s0 forming a pair with the i+1-th to x-th on-demand data DataDi+1_s0 to DataDx_s0 are latched and not transferred to stage 1 when the i+1-th to x-th Req/Ack signals ReqDi+1_s0 to ReqDx_s0 and AckDi+1_s0 to AckDx_s0 are not latched.

Hereinafter, a process of transmitting and receiving the on-demand data will be described with reference to a detailed structure of stage 1 of FIG. 6.

When the control block 110 receives the Req signal Req_s0, the control block 110 supplies an enable signal A to a latch for the bundled data to receive the control data Control_s0 and the bundled data Data0_s0 to Datai_s0.

Subsequently, a current-stage decoder 121 determines an operation to be executed at the current stage, i.e., selective input data information B analyzing the control data Control_s0 and transfers the information B to the control block 110.

Thereafter, the control block 110 supplies on-demand data enable signals C and D corresponding to the selective input data information to receive the on-demand data corresponding to the selective input data information.

In this case, each on-demand input block 140 includes a C-element ⓒ, each of the control logic Ctrl_i+1 to Ctrl_x, and a latch 140.

When the C-element ⓒ receives the on-demand-Req signals ReqDi+1_s0 and Reqx_s0 required at stage 1 received from stage 0 and the on-demand data enable signals C and D transferred from the control block 110, the C-element ⓒ outputs a latch enable signal E.

The control logic Ctrl_i+1 to Ctrl_x supplies the latch enable signal E transferred from the C-element ⓒ to the latch 140 and supplies the on-demand-Ack signals AckDi+1_s0 and AckDx_s0 to stage 0.

When the latch 140 receives the latch enable signal, the latch 140 receives the on-demand data from stage 0 and transfers the received on-demand data to the stage logic 120.

When the stage logic 120 completes calculation of both the bundled data and the on-demand data, the stage logic 120 transfers a completion signal indicating calculation termination to the control block 110.

The control block 110 generates the Req signal Req_s1 for the always bundled data channel to be transferred to stage 2 and outputs an enable signal F directing an output of the bundled data Data0_s1 to Dataj_s1 and control data Control_S1 to be transferred to stage 2. Herein, the control data Control_S1 includes a functional code for calculation required at the next stage and output data discrimination information required at the next stage.

A next-stage encoder 122 transfers output data discrimination information to the control block 110 and the control block 110 supplies enable signals G and H to a latch in each on-demand output block 160 outputting the on-demand data to be transmitted to the next stage. Thereafter, stage 1 performs the above data transmission process with stage 2 and transmits data to stage 2.

Figure 7:
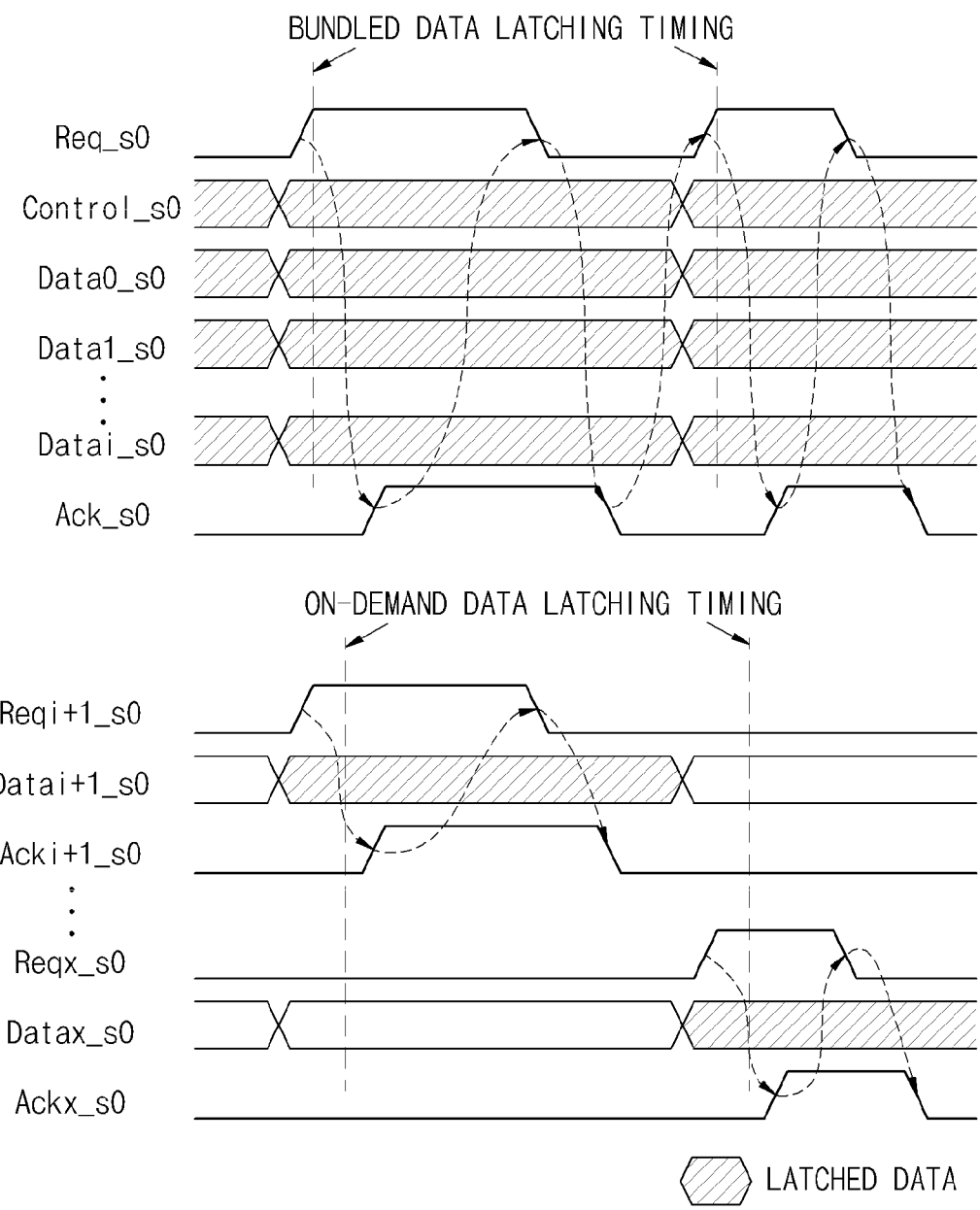
FIG. 7 is a data transmission timing diagram from stage 0 to stage 1 according to an exemplary embodiment of the present invention.

Hereinafter, referring to FIG. 7, a process of transmitting the bundled data and the on-demand data from stage 0 to stage 1 will be described. FIG. 7 is a data transmission timing diagram of bundled data and on-demand data transmitted from stage 0 to stage 1 according to an exemplary embodiment of the present invention.

As shown in FIG. 7, stage 0-based control data Control_s0 and i+1 bundled data are classified into always data which are transferred always and in-bundle transmitted according to the Req signal and the Ack signal.

Further, the on-demand data DataDi+1 and DataDx selected from total x−i on-demand data DataDi+1 to DataDx are transmitted according to the on-demand-Req/Ack signal. FIG. 7 shows a case in which DataDi_1_s0 and DataDx_s0 are activated and transferred in previous and next cycles, respectively, as an example.

In FIG. 7, it can be seen that the on-demand data is latched slightly later than the bundled data. This includes latency from the time when the control block 110 generates the latch enable signal to the time when the latch enable signal is transferred to the C-element. Herein, it is assumed that the inputted on-demand data DataDi+1_s0 and DataDx_s0 are stable before the on-demand-Req signals ReqDi+1_s0 and ReqDx_s0 rise.

As described above, according to the exemplary embodiment of the present invention, the on-demand data required at each stage is verified through the control data and only the required on-demand data can be selectively inputted, and as a result, power consumption required to transfer data can be significantly reduced.

In addition, according to the exemplary embodiment of the present invention, by discriminating a bundle transmission channel in which bundle transmission is made at all times and an on-demand data channel in which bundle transmission is made as necessary, a case in which transmission of data not required at each stage can be suppressed, thereby significantly reducing a stall occurrence probability.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An asynchronous pipeline system having a plurality of stages based on a 4-phase protocol, comprising:
  a first stage among the plurality of stages; and
  a second stage among the plurality of stages connected next to the first stage,
  wherein the first stage transmits and the second stage receives bundled data and control data through an always bundled data channel and on-demand data through a selectively activated on-demand data channel,
  wherein the on-demand data channel is only activated in case of need of the second stage by an on-demand-hand shake request signal transferred from the first stage,
  wherein the second stage is configured to verify data to be used at the second stage among the bundled data and the on-demand data using the control data, and the on-demand data needed at the second stage is selectively inputted through the activated on-demand data channel to the second stage, wherein the second stage does not receive the on-demand data when it is not necessary with the second stage as the on-demand data channel is not activated, as a result of authentication of the control data.

2. The system of claim 1, wherein the second stage verifies data to be used at the second stage among the bundled data and the on-demand data using the control data.

3. The system of claim 1, wherein the first stage transmits and the second stage receives the bundled data in synchronization with state transition of a pair of hand shake protocol request and acknowledge signals through the always bundled data channel.

4. The system of claim 1, wherein the first stage transmits and the second stage receives the on-demand data in synchronization with the on-demand hand shake protocol request and acknowledge signals through the on-demand data channel.

* * * * *